United States Patent [19]

Markvoort et al.

[11] Patent Number: 4,802,152
[45] Date of Patent: Jan. 31, 1989

[54] COMPACT DISC DRIVE APPARATUS HAVING AN INTERFACE FOR TRANSFERRING DATA AND COMMANDS TO AND FROM A HOST CONTROLLER

[75] Inventors: Jan A. Markvoort; Adrianus J. M. Van Alphen, both of Eindhoven, Netherlands; Marinus J. B. M. Monen, Colorado Springs, Colo.

[73] Assignee: U.S. Philips Corporation, New York, N.Y.

[21] Appl. No.: 848,614

[22] Filed: Apr. 7, 1986

[51] Int. Cl.⁴ .................... G11B 21/10; G06F 3/08
[52] U.S. Cl. .................................. 369/32; 369/52; 371/38; 364/900
[58] Field of Search ............... 369/32, 59, 33, 41; 360/78; 371/38–40, 57; 364/200, 900

[56] References Cited

U.S. PATENT DOCUMENTS

| | | | |
|---|---|---|---|
| 3,478,324 | 11/1969 | Couleur et al. | 371/57 |
| 4,086,636 | 4/1978 | Cizmic et al. | 360/78 |
| 4,413,340 | 11/1983 | Odaka et al. | 371/39 |
| 4,587,643 | 5/1986 | Monen et al. | 369/32 |
| 4,639,863 | 1/1987 | Harrison et al. | 364/200 |
| 4,641,295 | 2/1987 | Furukawa et al. | 369/32 |
| 4,680,764 | 7/1987 | Suzuki et al. | 371/40 |

Primary Examiner—Aristotelis M. Psitos
Assistant Examiner—Steven R. Garland
Attorney, Agent, or Firm—Marianne R. Rich

[57] ABSTRACT

A drive apparatus for an optical disc read system. An interface is provided to a host controller for reading out data on a compact disc. The read out data is converted from parallel to serial format, and transmitted with a clock stream to the host controller. Host controller commands are transmitted to the drive apparatus which recognizes the command as either allowable or non-allowable. The interface provides signalling to the host controller of drive error conditions, spin up/non-spin up conditions, and non-allowable command situations for the controller.

5 Claims, 2 Drawing Sheets

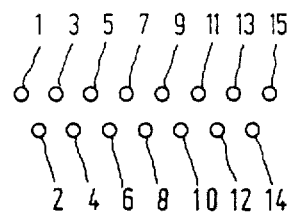
FIG. 3
| 1 | COMMAND BYTE | | | | |
|---|---|---|---|---|---|
| 2 | FRAME NUMBER | | | | |
| 3 | SECONDS | | | | |
| 4 | MINUTES | | | | |
| 5 | FRAME NUMBER | | | | |
| 6 | SECONDS | | | | |
| 7 | MINUTES | | | | |
FIG. 4
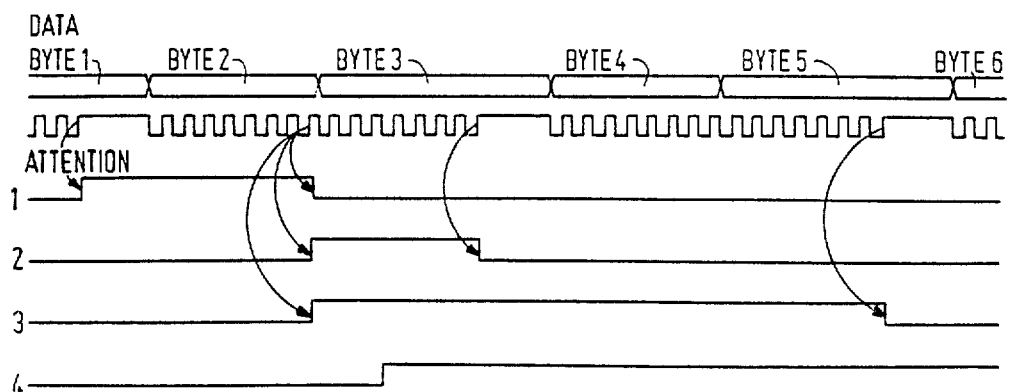
FIG. 5

COMPACT DISC DRIVE APPARATUS HAVING AN INTERFACE FOR TRANSFERRING DATA AND COMMANDS TO AND FROM A HOST CONTROLLER

BACKGROUND OF THE INVENTION

The present invention relates to a compact disc drive apparatus specifically designed for data storage and for interfacing to a data processing device for which the data record operates as a read-only memory. It has been found that flat, optically readable, data records of the now well-known "compact-disc" format would fill a need for easily distributable and easily storable read-only media for programs, fixed data and other fixed information usable in a wide variety of applications and user computer configurations. Accordingly, it is an object of the present invention to provide such a disk drive apparatus or player for which the data integrity, easy interfaceability and highly reliable interactivity would be guaranteed. A slightly different field of use could require the mixed storage of digital data and audio information, notably music. Here, the same requirments apply as above.

DISCUSSION OF THE PRIOR ART

The "compact disc" system, as from about 1982, is being world-wide marketed and used for high-quality, permanent, audio-recording. The medium is a 12 cm diameter flat record of about 2 mm thickness wherein the information storage is realized as stamped recesses in an optically reflective layer. Information read-out is effected by a laser beam in a reflective mode. Data is stored in a single spiral track with a pitch of a few microns only. Data integrity is maintained by a double, interleaved Reed-Solomon code with a minimum Hamming distance equal to five over the symbols of a frame of 32 and 28 symbols for the two Reed-Solomon codes, respectively. A patent for the data format of compact disc audio was applied for under Japanese patent application No. 80-67608, corresponding U.S. patent application Ser. No. 320,492 (error protection) (PHQ 80.009 now U.S. Pat. No. 4,413,340), and Netherlands patent application No. 8004028, corresponding U.S. patent application Ser. No. 286,982 (channel data modulation, PHQ 80.007), now U.S. Pat. No. 4,501,000. Furthermore, it was found preferable to add, specifically for data storage purposes, a so-called third error protection layer wherein a pseudo-product code, again according to the Reed-Solom principle is realized on a sector basis. The length of a sector corresponds to a plurality of the lengths of a frame of the audio format as specified above. Each sector comprises a synchronization information, a header information (inclusive of a mode indication), and data. The data comprises non-redundant data, redundant data for error correction, and additionally for error detection (CRC) and a few spare symbols. In a certain special mode, all data is used as non-redundant data for enhancing the storage capacity of a sector. No ECC (Error Correcting Code) or CRC-bytes are present. The third error protection layer of the so-called "CD-ROM" format was applied for a patent under Japanese patent applications No. 84-57596 (PHQ 84.009) corresponding to U.S. application Ser. No. 320,492, now U.S. Pat. No. 4,413,340, and 84-57595, corresponding to U.S. application Ser. No. 714,892 (PHQ 84.008), now U.S. Pat. No. 4,680,764.

DESCRIPTION OF THE PREFERRED EMBODIMENT

Hereinafter, the "CD-ROM" drive apparatus is specifically disclosed with respect to its interface to a host controller. The drive contains all electro-mechanical controls for holding and rotating the disc medium, for controlling and adjusting the read-out laser arrangement, for executing cross-track random access, for reading the data and demodulating the channel bits to code bits, for decoding the data according to the double cross-interleaved Reed-Solomon error protection code format of the first two error protection layers, to read-out additional control data and regrouping such control data according to the latter patent application citation, and for driving and maintaining output information and control signals on predetermined timing and voltage levels. Apart from the disclosure as given hereinafter, most of the internal functioning of the drive apparatus is left out for attaining clarity of the disclosure. Specific advantages of the present invention are as follows.

Data output is serial at single bit width. It has been found that this low bit width is quite sufficient, and, moreover, is less costly than parallel versions.

Each data bit is clocked, which represents an extremely efficient and easy-to-implement mechanism.

The drive is provided with a descrambled output for facilitating data handling and recognition of specific synchronization patterns by a host.

Decoding errors are signalled in parallel with the data, so that the third layer of error protection may be used by the host in case of need. This signalling (URD) is additionally being operative as error pointer mechanism.

An input for host controller commands.

A single bid width additional output for outputting drive status bytes to the host controller.

BRIEF DESCRIPTION OF THE DRAWINGS

FIG. 3 is a drive connector pin out diagram;

FIG. 4 is a command heptabyte;

FIG. 5 is a byte sequence and attention flag timing diagram.

DESCRIPTION OF THE PREFERRED EMBODIMENT

A specific purpose of the interface is to allow reception of a sector number from an attachable host controller. In audio, the block number specifies a sequence of —minute, second, audio frame—indications. In data recording, the block number specifies a sequence of —minute, second, and sector—identifications. Upon reception of such sector number as specified in a read data command, the drive apparatus first accesses the sector or block in question, and thereafter outputs data of this sector and all subsequent sectors in the way known from Direct Memory Access features. In principle, this may continue up to the end of the disc's track. The data is outputted serially as from the first bit of the sync pattern of the sector or the sector(s) which comprise(s) the addressed block. The outputted information contains all sync, mode and header information, inclusive of EDC, ECC information if present, data information (inclusive of such data in lieu of EDC and ECC information) and spare bytes. The outputting may be selectively terminated by a break command, which acts only as termination, or by another drive command receivable which would control both this termination and also may control a new accessing operation. If the drive signals a drive error, it outputs an attention signal, as hereinafter specified. The same occurs in case of signalling of a data error. The drive is capable of precisely determining a beginning point of a sector access, and will indicate this beginning point by starting the data clock exactly on a sector boundary. Data and data error signalization are validated by a clock signal.

Figure 1:
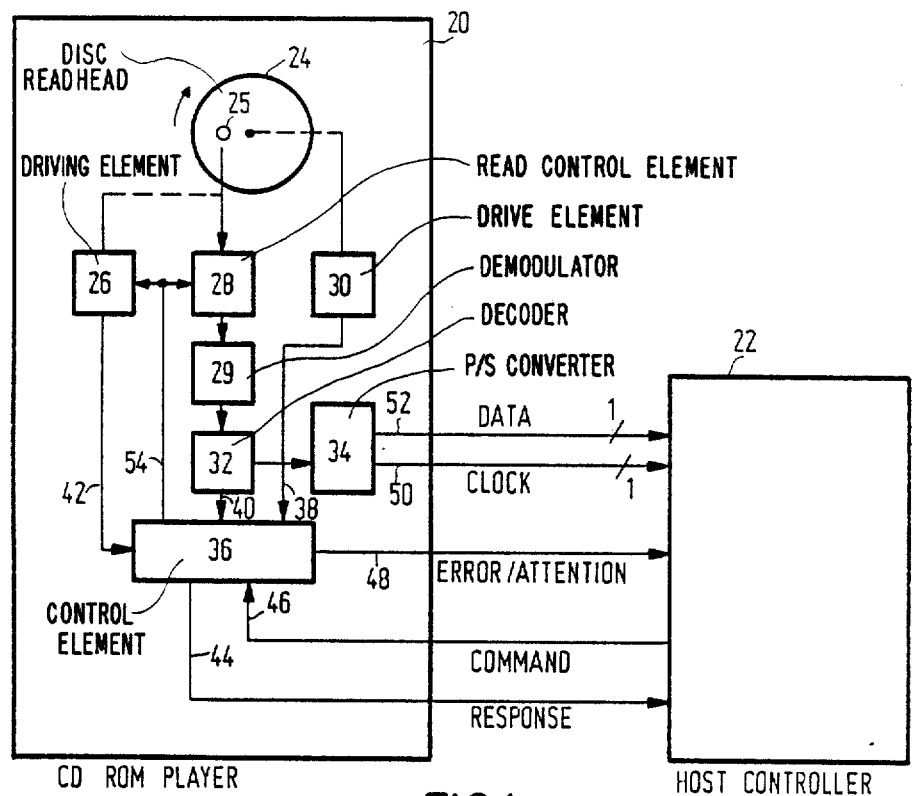
FIG. 1 is an elementary block diagram of a disc drive apparatus according to the invention.

FIG. 1 gives an elementary block diagram of a disc drive apparatus according to the invention. Element 22 is a host controller or user apparatus; with respect to this element only an interface on lines 44, 46, 48, 50, 52 is defined. Element 20 is the actual disc drive apparatus. Disc 24 is detachably connected to the drive apparatus. The driving is effected and regulated by drive element 30. Element 25 symbolizes a read head mounted on a head arm that can be moved in a cross-track (about radial) direction for random accessibility. This cross-track motion is controlled by driving element 26. This element also symbolizes the mechanism for optical centering the reading head to a track, once the accessing of a radial position has been realized. Element 28 is a read control element, inclusive of a read amplifier. Element 29 receives a serial stream of channel bits from element 28, and demodulates these channel bits into code bits as specified by the citation hereabove. Element 32 receives the code bits and implements the decoding of the cross-interleaved double Reed-Solomon error protection on a frame format basis. The result of this decoding is for each frame 24 data symbols that on the level of this decoding act as user symbols, plus for each frame a header as defined in the CD-format. This header is not protected by the cross-interleaved Reed-Solomon format, but is self-protected (by another code). Furthermore, for each user byte a signalization reliable/unreliable (URD) is produced as based upon the decoding result. The user data are outputted to element 34, the other information (header, and URD) to control element 36. Element 34 is a parallel-to-serial converter, as will be explained later, for serializing the user bits on line 52, in synchronism with a clock train on line 50.

Control element 36 emits control signals on line 54 (which may be multiple) to access element 26 for eliciting cross-track motion, and to reading element 28 for activating reading operations. Furthermore, control element 36 receives status signals from access element 26 (indicating radial position), from drive element 30 (indicating correct/incorrect rotary velocity) and from decoding element 32 (frame header information and URD flags). Externally, control element 36 receives commands from host controller 22 on line 46, and emits responses to such commands on line 44 and error/attention signals on line 48. Thus, the interface path width between CD-ROM-Player and host controller is five bits wide.

DESCRIPTION OF THE DATA PATH

Figure 2:
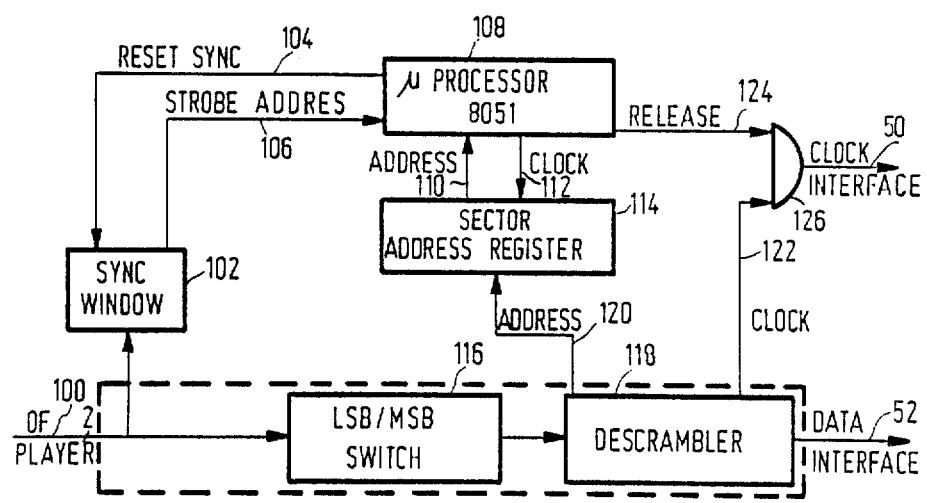
FIG. 2 is a block diagram of the data path in the drive apparatus.

FIG. 2 gives a block diagram of the data path in the drive apparatus, notably in parallel-to-serial conversion element 34. Input 100 is two bits wide, one bit for the so-called "left channel" and one bit for the so-called "right channel". On each of these channels, according to the "compact disc" format convention, sixteen bit samples are configured as two sucessive eight bit bytes, with the most significant byte leading and the least significant byte trailing. Element 116 is a most significant/least significant byte switch for interchanging this sequence within a sixteen bit sample, causing the least significant byte to become the leading byte, and for converting the data stream to single-bit width, the eight bits of each byte following each other in direct succession. Note that such sixteen bit smaple may relate to a HIFI-audio sample, or, alternatively to a sixteen bit data element having an arbitrary meaning. Element 108 is a microprocessor of the well-known type 8051 or 8031, with internal clock facility. It has been programmed for the data handling to be described hereinafter. In the first place it generates a synchronization reset signal on line 104. This resets synchronization window element 102. The latter is a kind of counter, which diverts any sector address bytes out of the data stream received as strobe address for microprocessor 108 on line 106. For the remainder of the time, element 102 is nontransmissive. Element 118 is a descrambler for compensating for a scrambling operation which had been performed before recording the data. The scrambling is effected by means of a fifteen-bit shift register of which the outputs of the fourteenth and fifteenth bits are EXORED and fed to the input of the first bit. The output of the fifteenth bit is EXORED with the data to realize the scrambling effect. The scrambling is effected to counteract a DC-component which, due to the CD-modulation rules, could be introduced by certain recurrent patterns that could occur in the data stream. Such DC-component could lead to spurious detection of synchronization patterns. The descrambling will not operate on the normal synchronization patterns. Thus, the descrambler has a reset mechanism that is controlled by the microprocessor. The double address detection (strobe address by window element 102) and sector address from descrambler 118 raises the degree of reliability. Note that scrambling and descrambling are mutual counterparts. After descrambling, address information is output on line 120 to address register 114. Under control of clock pulses on line 112 this address is forwarded to microprocessor 108. This microprocessor has received from the host controller 22, along line 46, the address value to be sought. For simplicity, the relevant connection from control element 36 to parallel to serial conversion element 34 has not been shown in FIG. 1. During any sought sector, microprocessor 108 will produce a continuous release signal on line 124, thereby unblocking AND-gate 126. Descrambler 118 produces data bits on line 52, in synchronism with clock pulses on line 122. As long as gate 126 is unblocked, these clock pulses appear on clock line 50. Lines 50 and 52 constitute part of the player-to-host interface.

ELECTRICAL INTERFACE

The drive apparatus is provided with a ten-wire cable for attaching to a host controller. Bus drivers and receivers have been specified according to EIA Std. RS 422 compatible differential line drivers/receivers. A negative signal has a termination resistance of 120 ohms to ground. A positive signal has a termination resistance of 240 ohms to +5 volt and 240 ohms to ground potential. The cable type is shielded twisted pair, five pairs in total, thus realizing a simple, effective and shielded interconnection specifically for a stand alone drive. A fifteen-pin standard connector is used according to FIG. 3 and the following pin-out specification (pins 11-14 not used for interfacing) applies:

| Pin | Signal name |
|---|---|
| 1 | Response +, 2 Response - |
| 3 | Command +, 4 Command -; Note: all edges and levels are specified referencing the signal + line of each differential interface signal. |
| 5 | Data +, 6 Data -; A logic high on a signal + line is the asserted, or logic 1 value of the signal. |
| 7 | Data clock +, 8 Data clock -; |
| 9 | Attention +, 10 Attention -; |
| 15 | Ground. |

An advantageous extension is realized by adding additional output lines for signals according to the compact disc musical format compact disc players for audio only feature various solutions for such output which for the present drive apparatus may represent an advantageous additional capability. Apart from the command, all signals are transferred from the drive.

The data line passes data from the drive. The data is valid at the rising edge of the data clock. Data is sent bitserially byte by byte with the least significant bit first. The data starts with the first bit of the sync pattern of the specified sector.

Data clock is intended by use by a controller to clock all transfers of data on the data line. The peak bit transfer rate is at least 3 Mbit/sec. Data is valid on the rising edge of data clock, and changes on the falling edge.

"Attention" is asserted by the drive when e.g. a drive error or a command error has occurred. For data errors, it is valid for 1 byte transfer time, is byte synchronous with the data in error, and asserts on each byte in error (attention will not been deasserted between consecutive error flags). The data error is only valid if there is a data clock. For other attention conditions than data errors, attention will latch until a "clear error" command is received by the drive. The only valid commands while attention is asserted are "read status" and "clear error". Attention is a global indication covering drive errors, data errors, command parity errors, illegal commands, in short any condition in the drive requiring controller intervention. This is the only way the drive tells the controller something has changed.

The "command" line is used to send commands to the drive from the controller. Commands are transmitted bitserially and asynchronously, according to an UART protocol, with 1 start bit (logic 0), 8 data bits, 1 odd parity and 1 stop bit (logic 1; and stays in this level until the next start bit). Command and response bytes are sent low order bit first.

The Baud rate of the command and response lines is 19.2 k Baud. The drive with handshake all received command bytes by responding with the same bytes on the response line. The controller must wait for receipt of this byte before sending the next byte of the command to the drive (except break). If the command byte received by the drive has ban parity the drive may echo the byte as received with the bad parity, or correct the parity before echoing. If the received echo is wrong, the controller can give a break or do a read status command, or do nothing.

The drive will reset its internal hardware upon reception of a "break" condition on the command line. A "break" is defined as a start condition of at least 22 bit times, which is minimum 1.15 msec long. The drive must reset upon receiving a start bit of longer than 20 bit times, but should not reset if the start bit is shorter than 12 bit times. The drive will not handshake the "break" bytes on the response line. Upon detecting a "break", the drive will execute a hardware reset (identical to power up reset). A "break" on the command line will cause the drive to terminate execution of any command, initiate its internal diagnostics for RAM, ROM, microprocessor, etcetera and assert the attention line upon completion or failure of these tests. For brevity, the nature and execution of these tests has not been described herein. The attention line will remain asserted until a clear error command is received by the drive. A read status command received prior to the "clear error" will signal to the controller whether there were any errors during the reset.

The "response" line is used by the drive to echo the command bytes and to send the response bytes to the controller. The response bytes are defined hereinafter for read characteristics and for status. Responses are transmitted in the same way as commands. The controller will request each response status byte by sending a predetermined request byte (hex 9C). The drive will then respond with one byte of the packet which may have a predetermined plurality of bytes. The controller will keep track of the required number of response bytes for each command, and request only less than or equal to the maximum defined number of response bytes. If the controller requests a response byte, but the drive has no more to send, the drive will signal an illegal command error. If the controller does not request all response bytes of status or characteristics, but issues another command, the new command will be executed without error signalization.

COMMAND PROTOCOL

Commands are sent to the drive by sending a variable length command packet to the drive over the command line. The command format is one byte of command, possibly followed by parameter bytes. The number of parameter bytes for each command is specified by the command itself and by the command protocol revision in the response packet for the "read characteristis" command. There are two classes of commands: drive commands, and commands for requesting status. The status commands are "read characteristics", "read status", and "clear errors". Status commands may be executed while drive commands are still executing without affecting the drive command in process. All undefined command codes will cause an "illegal command" error and be treated as one byte commands. They will handshake normally, then cause an "illegal command" error, and assert attention. If any command other than a "read status" or "clear errors" is issued while attention is asserted, the drive will handshake the command normally, but ignore the command and set the "communication error invalid" command.

Each new drive command overrules the preceding command. The command packet is a maximum of 7 bytes for commands A6, B1, as shown in FIG. 4. This maximum format is used to indicate both the beginning and termination address of an audio or data reproduction. In no other command, a termination address is present. Bytes 2 and 5 indicate the frame or sector specification of the beginning and termination address, respectively. Bytes 3 and 6 specify the seconds and bytes 4 and 7 specify the minute values.

PACKET DESCRIPTION

Hereinafter, fourteen specified commands are given. All command codes are defined in an error protective code format with a minimum Hamming distance of four. Thus, three bit-errors are detectable for indicating an erroneous or illegal command. The following commands have been assigned:

| Code (in Hex) | Command |
|---|---|
| 17 | Read data |
| 2D | Read characteristics |
| 3A | Read status |
| 4E | Clear errors |
| 59 | Seek |
| 63 | Spin up disk |
| 74 | Spin down disk |
| 8B | Disk select |
| A6 | Read data from address 1 to address 2 |
| B1 | Read audio from address 1 to address 2 |
| C5 | Seek audio (single address, audio subcode) |
| D2 | Lock/unlock compartment door of drive |
| E8 | Undefined command for future use |
| 9C | Parameter request (not a command proper - used to request parameters in a "read characteristics" or "read status" command). |

In the above, the rationale for discerning between data addressing and audio addressing is that data is addressed on a sector basis, while audio is addressed on the frame basis of the compact disc audio format.

THE COMMAND

Read data (17) starts at a specified sector number, and continues reading until receiving a new drive command, or break. The read command transfers all data from a sector, including sync/header, and redundant information, if present, to the controller. The data transfer starts with the first bit of the sync pattern of the requested sector, and continues until one of the drive command is received by the drive. The data transfer may start any time within the long time-out period after the drive receives the last parameter byte. When another drive command is received (including another read command) the data transfer stops before the drive sends back the handshake byte for the first byte of that command. The read data command uses 3 parameter bytes. These bytes contain the sector number, with the low order sector number byte in parallel byte 0. The sector number is specified as 1/75 seconds (frames), second and minute (two BCD digits each). Valid ranges for each of these parameters are as follows:

Minutes: 0–99
Seconds: 0–59
Frames: 014 74

Valid Sector Numbers start at 00:02:00 (2 seconds) and extend to the maximum sector number as reported below minus 00:02:00. These two seconds at beginning and end, respectively, of the useful data interval are called pregap and postgap, respectively. The pregap only starts after the lead-in interval.

Reaching the last sector number of the disk will cause an End of Disk error, terminate the read, assert the attention and execute a seek to the sector specified by the previous Read command, and hold that position. The maximum sector address of the current disk will be placed in bytes 8–10 of the Status packet (Last Valid Sector Address) and remain there until receipt of Clear Errors command. Read data implies if necessary a spin up and a seek, attention is not asserted. Command A6 corresponds to command 17, but only terminates the read when the termination address is reached. When the termination address is larger than the maximum sector address on the disc, execution corresponds to command 17.

The "read characteristics" is a command consisting of one command byte (2D) and a number of request bytes (9C). The drive echoes the command byte normally and responds to the request bytes with the subsequent characteristic byte. The number of response bytes must be less than or equal to the maximum number of response bytes. This command may not be issued when attention is asserted. The characteristics packet contains the following information, in the order shown below characteristic byte zero first:

| Characteristics | length | value in Hex |
|---|---|---|
| 0 Command protocol rev. | 1 byte | for present drive versions, called EC100 and CM100, the value 01 is used. |
| 1 Drive type | 1 byte | to be defined |
| 2 Data transfer rate | 1 byte (10 Kb/sec units) | ((for 1.4 Mbit/sec) 12 is reserved) |
| 3 Hardware revision number of the drive | 1 byte | To be defined per serial number |
| 4 Microcode rev. number | 1 byte | To be defined per serial number |
| 5 Drive serial number | 3 bytes (binary) | To be defined per serial number |
| 6 Long timeout value | 1 byte (in seconds) | maximum 1E |
| 7 Short timeout value | 1 byte (in 1/10 seconds) | maximum 0A |
| 8 Max. number of disks | 1 byte | (default value 00 if this jukebox feature is not used). |

Herein, the short timeout is defined as the maximum time allowed between the sending of a command byte and the receipt of a response byte by the controller. The long timeout is defined as the maximum time allowed between the initiation of a command to the end of the command, where the end of a command is defined as the start of read data, attention asserting, or the end of a seek. This timeout also supplies to spin up and spin down commands.

If within a number of minutes (e.g. 15 min) no command or data output action is issued the drive motor will spin down and the laser will shut off. Read status is a command consisting of 1 command byte (3A) and a number of request bytes (9C). The drive normally echoes the command bytes and responds to the requested byte with the subsequent status byte. The number of response bytes is smaller than or equal to the maximum number. This command does not change any status byte. A "clear error" command is required to clear the error status indications. Drive error codes are not overwritten by subsequent errors. Status packet information may be for example, as follows:

| | |
|---|---|
| 0 | Reserved for unit number, which may for each drive be preset by a so-called DIP switch, which can be manually actuated. |
| 1–4 | Last drive command packet that has been given. |
| 5, bit 0 | Execution status (0=executed, 1=in execution). |
| bit 1 | Execution result (0=no error, 1=error). |
| bit 2 | Spun up (0=not spun up, 1=spun up). |
| bit 3 | Drive not ready (1=not ready, 0=ready). |
| bit 4 | Door has been opened (1=opened). |
| bit 5 | Locked (door) |
| bit 6–7 | Reserved (always 0). |
| 6–7 | Drive error code in hexadecimal notation: |

-continued

```
00 = no error
02 = illegal sector address
03 = sync error
04 = seek error
05 = track error
06 = end of disk
08 = focus error (or no disk mounted)
09 = illegal disk
0B = ROM error
0C = RAM error
0D = disk not readable
0E = hard reset normally complete
0F = operator requested spin down
10 = selected disk not present (jukebox only)
13 = unit number changed
14 = radial error
15 = time out due to inactivity time out
16 = operator requested spin up
17 = reserved
18 = subcode error
19 = start address larger than end address
Communication error code (in hexadecimal)
01 = illegal command code
07 = parity error command line
0A = communication error
11 = bad parameter byte
12 = invalid command (command received while attention
     asserted)
8-10 Last valid sector address (specified in 1/75 th seconds,
     seconds and minutes (two BCD digits each)) or end of disc
     address (after an illegal sector address). (Not valid if
     disk is spun down).
11   Selected disk number.
```

Whenever a status byte 6 or 7 changes from "no error" to "error", attention is asserted.

DETAILED DESCRIPTION OF DRIVE STATUS BYTE

This byte of the status packet contains the current drive status.

Bit assignements are: 7, 6 always zero; 5 locked; 4 door open; 3 drive not ready; 2 spun up; 1 error; 0 execution Status of a drive command: 0=done/1=in execution.

Error: Indicates whether or not an error has occurred since the last clear errors command. This bit is set to 1 by all drive error conditions, and asserts attention. When an error occurs, the current sector number is latches into the last valid sector address field of the status packet until the next "clear errors" command resets the error bit to zero.

The following commands and drive status changes set "attention" and an error code when they complete, but do not set the error bit: spin up, spin down, spin down due to inactivity timeout, reset complete, and unit number changed.

Spun up: indicates that the drive is spun up with a sufficient rotary speed. 0=not spun up, 1=spun up.

Drive not ready: asserts when the drive door is closed and there is a disk properly inserted in the drive. The disk does not have to be spinning for this bit to be set. 0=ready, 1=not ready.

Drive door open: asserts when the drive door is opened, and remains set until the drive door is closed and a "clear errors" command is received. Attention is set on the assertion of this bit. If a "clear errors" is received while the drive door is open, attention will clear, but this bit will remain set.

"Clear errors" (4E) is used to clear the error indications in the status packet byte 6, 7 and bit 1 of byte 5, except such attention that is used for data errors. This is the only command that clears errors. This command uses no parameter bytes. Errors must be cleared and attention deasserted before the drive returns the handshake byte for the command.

The "seek" command (59) is used to seek to the specified sector number and enters hold track mode that is the spiral track is not followed, but upon each revolution a reverse jump is executed. This operation therefore continually accesses the same winding of the track. There are three parameter bytes used for a seek, with the low order sector number byte in parameter byte 0. An attempt to seek beyond the last sector number on the disk will cause "attention" to assert and terminate the seek and the last valid sector address of the disk is placed in the last valid sector address (byte 8-10 of status) and "attention" is asserted. This command is aborted by receipt of any other drive command by the drive. There is no explicit completion indication for the seek command. This command is used to allow repositioning for a reread during error processing, and overlapping seeks. The "read" command supersedes the "seek" command cleanly without any error indicatios for this to be possible. This command may not be used when attention is asserted. "Seek" implies, if necessary, a spin up, attention is not asserted.

Spin up disk (63) is used to spin up a disk loaded in the drive. This command uses no parameter bytes. The drive will spin up the disk and seek to a fixed position of the disk. If the disk is already spun up, the drive will treat the spin up as a recalibrate command (optical head goes to the fixed position on the disk). Attention will assert at the completion of the spin up sequence. It may not be issued when attention is asserted.

Spin down disk (74) is used to spin down a disk loaded in the drive. This command uses no parameter bytes. "Attention" will assert on initiating of the spin down. It may not be issued when attention is asserted.

Disk select (813) specifies which disk (less than or equal to maximum number of disks) to use on the selected drive. This command is meaningful only with a "Jukebox" type drive, which can select from an internal library of disks. The disk select command uses one parameter byte. Parameter byte 0 contains the disk number. A drive without this capability should respond to this command with an illegal command error. This command may not be issued when error is asserted. The maximum disk number allowable is contained in the package sent to the controller by the read characteristics command. If a disk number not present in the library is requested the drive should respond with a selected "disk not present" error.

Read audio (B1) operates in the same way as "read data" but operates on the audio address code which reside in the audio subcode (not in a specific fields of the sector).

Seek audio (C5) in the same way as command seek data (59).

Lock/unlock (D2) operates to lock/unlock the disk compartment of the drive by activating/deactivating an electromagnet not further shown.

DESCRIPTION OF A TIMING DIAGRAM

FIG. 5 gives a byte sequence timing diagram, by way of example. Six byres are shown, each byte being associated with eight clock pulses on clock line 50. The data is valid on the rising clock edges. No data content has been shown for simplicity. Beneath these two traces "data" and "data clock" four different examples are given for contingent occurrencies of the "attention" signal. Also, the relation between attention as following the final upgoing clock edge related to a data byte is shown. In example 1 a flag is asserted on byte 2. In example 2 a flag is asserted on byte 3. In example 3 a flag is asserted on bytes 3, 4 and 5. Thus, the attention is asserted at the final clock pulse of the foregoing byte and dissappears on the final clock pulse of the actual byte. In the fourth example the attention is asserted asynchronously by the microprocessor. This will be switched off when command 4E (=clear errors) is sent by the host controller to the drive apparatus. In case of error flags occurring on the "attention" line, these will only switched off after the eighth and sixteenth rising edge of an eight bit clock pulse packet. The same applies to a switching-on event.

What is claimed is:

1. A compact disc drive apparatus for data storage, said data being organized in storage frames in a double cross-interleaved double Reed-Solomon error protection code format modulated by an eight-to-fourteen run-length-restricted channel bit format, non-redundant bytes within said storage frame format being organized in storage sectors and having per sector a sequence of synchronization information, header information, and data information comprising:

electro-mechanical disc-driving means for holding and driving a data storage record;

accessing means for radially accessing a data track on said record;

reading means for reading an accessed data track and a sector thereon as specified by a predetermined data sector specification;

demodulating means coupled to said reading means for receiving channel bits and demodulating such channel bits to a sequence of code bytes;

decoding means coupled to said demodulating means for receiving said code bytes and by means of a code format represented by redundant bytes decoding said code bytes into a sequence of compact-disc user bytes; and an interface means for interfacing said drive apparatus to an external host controller, said interface means comprising:

parallel-to-serial conversion means fed by said decoding means for producing bit-serially said compact-disc-user bytes as user bits;

clock means fed by said parallel-to-serial conversion means for producing synchronously with said user bits a clock stream having a validating clock pulse for each of said user bits;

control means having a first input for receiving host controller commands, and a recognition means for recognizing any command received as either allowable or non-allowable a first output connected to said reading means for controlling said accessing means, a second input for receiving status information regarding said electro-mechanical driving means from said accessing means and from said decoding means, and a second output for signalling drive error conditions, spin-up/non spin-up situations and non-allowable command situations for use by said controller.

2. A drive apparatus as claimed in claim 1, wherein said second output has a single bit width and furthermore is provided with signalling means for signalling a user byte error detection in synchronism with the production of said user bytes to said host controller wherein an erasure correction to be executed is signalled.

3. A drive apparatus as claimed in claim 1, further comprising means for controlling said parallel-to-serial conversion means for reading out any total content of a storage sector, inclusive of synchronization information, header information, and additional spare information on a data line.

4. A drive apparatus as claimed in claim 1, wherein said control means has a third output for bitserially transferring a drive apparatus status packet-byte in response to a read status command received from a host controller.

5. A drive apparatus as claimed in Claim 1 further comprising descrambling means, and wherein said parallel-to-serial conversion means is provided with switching means for receiving a sixteen bit sample with its most significant byte leading and transferring this sixteen bit sample to said descrambling means in the order of least significant bytes first.

* * * * *